(12) United States Patent
Henry et al.

(10) Patent No.: US 6,461,652 B1
(45) Date of Patent: *Oct. 8, 2002

(54) COLOR STABLE IRON FORTIFIED COMPOSITIONS

(75) Inventors: William John Henry, Taylor Mill, KY (US); Xiaobing Xi, West Chester, OH (US); Michel Lucien Hubert Lannelongue Favre, Cincinnati, OH (US); Haile Mehansho, Fairfield, OH (US); Renee Irvine Mellican, Fairfield, OH (US); Jianjun Li, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/997,300

(22) Filed: Nov. 28, 2001

Related U.S. Application Data

(63) Continuation of application No. 09/445,630, filed on Dec. 9, 1999, now Pat. No. 6,358,544, and a continuation-in-part of application No. 08/549,109, filed on Oct. 27, 1995, now abandoned.

(51) Int. Cl.⁷ ............................. A23L 2/39; A23L 2/00; A23L 1/304
(52) U.S. Cl. ...................... 426/74; 426/590; 426/591; 426/72; 426/73; 426/548
(58) Field of Search .................... 426/74, 590, 591, 426/72, 73, 548

(56) References Cited

U.S. PATENT DOCUMENTS

| | | |
|---|---|---|
| 3,082,091 A | 3/1963 | Smith et al. |
| 3,397,063 A | 8/1968 | Carlson et al. |
| 3,734,742 A | 5/1973 | Morse et al. |
| 4,167,564 A | 9/1979 | Jensen |
| 4,182,778 A | 1/1980 | Hall et al. |
| 4,599,152 A | 7/1986 | Ashmead |
| 4,654,165 A | 3/1987 | Eisenberg |
| 4,661,358 A | 4/1987 | Brokken et al. |
| 4,684,528 A | 8/1987 | Godfrey |
| 4,725,427 A | 2/1988 | Ashmead et al. |
| 4,786,510 A | 11/1988 | Nakel et al. |
| 4,830,716 A | 5/1989 | Ashmead |
| 4,992,282 A | 2/1991 | Mehansho et al. |
| 4,994,283 A | 2/1991 | Mehansho et al. |
| 5,002,779 A | 3/1991 | Mehansho et al. |
| 5,008,120 A | 4/1991 | Tanaka et al. |
| 5,104,676 A | 4/1992 | Mahmoud et al. |
| 5,118,513 A | 6/1992 | Mehansho et al. |
| 5,141,758 A | 8/1992 | Monte |
| 5,336,510 A | 8/1994 | Chang |
| 5,340,315 A | 8/1994 | Kaye |
| 5,401,524 A | 3/1995 | Burkes et al. |
| 5,504,055 A | 4/1996 | Hsu |
| 5,520,948 A | 5/1996 | Kvamme |
| 5,670,344 A | 9/1997 | Mehansho et al. |
| 5,719,134 A | 2/1998 | Schmidl et al. |
| 6,051,261 A | 4/2000 | Bartholmey et al. |
| 6,358,544 B1 * | 3/2002 | Henry .................. 426/74 |

FOREIGN PATENT DOCUMENTS

| | | |
|---|---|---|
| EP | 0 297 681 | 1/1989 |
| GB | 2 212 396 A | 7/1989 |
| WO | WO 94/08473 | 4/1994 |
| WO | WO 94/15482 | 7/1994 |

OTHER PUBLICATIONS

Bookwalter, G.N., et al.—Iron–Fortified Syrup Blends: Preparation, Characteristics, Application. Journal of Food Science, vol 38 (1973), pp. 618–622.

Newman, D.G., et al.—Powder Flavour Drinks—An Up–And–Coming Market. Soft Drinks, Jan. 1981, p. 19.

Douglas, Frederic W., et al.—Color, Flavor, and Iron Bioavailability In Iron–Fortified Chocolate Milk. Journal of Dairy Science 64: 1785–1783 (1981), pp. 1785–1793.

Sigonorino, Dr. Charles A., et al.—Dyes Cause Color Problems? Try Certified Lakes. Food Engineering, May 1975, pp. 76 & 77.

DeMott, B.J.—Effects on Flavor of Fortifying Milk with Iron and Absorption of the Iron from Intestinal Tract of Rats. Journal of Dairy Sicence, vol. 54, No. 11, pp. 1609–1614.

Solomons, Noel W., M.D., et al.—Studies on the Bioavailability of Zinc in Humans: Effects of Heme and Nonheme Iron on the Absorption of Zinc. The American Journal of Clinical Nutrition 34: Apr. 1981, pp. 475–482.

* cited by examiner

Primary Examiner—Carolyn Paden
(74) Attorney, Agent, or Firm—Kelly McDow-Dunham; Carl J. Roof

(57) ABSTRACT

The present invention relates to color and flavor improvements in iron and zinc supplemented dry beverage powders having fruit and/or botanical flavor. Vitamins such as the B vitamins, vitamin A, vitamin C, and vitamin E can be added to the dry beverage mix. The supplemented dry beverage mix can also contain iodine, niacin and folic acid. In particular, methods for fortifying dry beverage mixes with certain bioavailable zinc and iron compounds without producing reconstituted beverages having undesirable color or flavor are disclosed. Also disclosed are beverages and foods fortified preferably with amino acid chelated iron that do not impart objectionable color due to the inclusion of a ferric ion reducing agent such as ascorbic acid and/or an agent such as citric acid that is capable of preferentially complexing ferric ion in the presence of polyphenols or flavonoids that are typically present in these beverages or foods.

35 Claims, No Drawings

COLOR STABLE IRON FORTIFIED COMPOSITIONS

CROSS-REFERENCE TO RELATED APPLICATIONS

This application is a Continuation of patent application Ser. No. 09/445,630, filed Dec. 9, 1999 and a Continuation-in-Part of application Ser. No. 08/549,109, filed Oct. 27, 1995 (now abandoned).

TECHNICAL FIELD

The present invention relates to dry beverage mixes, ready-to-drink beverages and foods other than beverages supplemented with iron and optionally zinc compounds that have excellent bioavailability. The iron and zinc compounds herein do not cause an off-flavor/aftertaste, are stable, and overcome the problem of discoloration often caused by the addition of these minerals to foods and beverages. The compositions may also include vitamin A, vitamin C, vitamin E, the B vitamins, folic acid and iodine. The present invention further relates to beverages and foods fortified with iron, especially amino acid chelated iron, without imparting objectionable color.

BACKGROUND OF THE INVENTION

In many countries, the average diet does not contain sufficient levels of iron, zinc, iodine, vitamin A or the B vitamins. Iron deficiency is well documented. Although iron deficiency is one of the few nutritional deficiencies in the U.S., it is common in most developing countries. Recent evidence suggests that nutritional zinc deficiency may be common among the people of many developing countries where they subsist on diets of plant origin (e.g. cereal and legume). Marginal zinc deficiency may be widespread even in the U.S. because of self-imposed dietary restrictions, use of alcohol and cereal proteins, and the increasing use of refined foods which decrease the intake of trace minerals.

Iron and zinc deficiencies can be overcome by taking supplements. Other methods of addressing these deficiencies include increasing the intake of foods naturally containing these minerals or fortifying food and beverage products. Usually, in countries where the people suffer from these deficiencies, the economy is such that providing minerals and vitamins as a supplement is expensive and presents significant distribution logistics problems. In addition, compliance, i.e., having the people take the vitamin and mineral supplements on a daily basis, is a serious problem. Accordingly, the delivery of iron and zinc along with other vitamins and minerals in a form that has high bioavailability and at the same time a non-objectionable taste and appearance, and in a form that would be consumed by a high proportion of the population at risk is desirable.

Vitamin and mineral fortified beverages and foods are known. Although substantial progress has been made in reducing iron deficiency by fortifying products such as infant formulas, breakfast cereals and chocolate drink powders, the formulations require milk which is often not available or affordable. Little progress has been made to address the problem of iron and zinc deficiencies in the general population. Moreover, little attention has been paid to formulating fruit-flavored dry beverage mixes supplemented with nutritional amounts (i.e., at least 5% of the USRDI) of zinc and iron with or without vitamins. Many fruit-flavored powdered beverages contain vitamins and/or minerals but seldom contain both zinc and iron at any significant level, see for example, *Composition of Foods*: Beverages, Agriculture Handbook No. 8 Series, Nutrition Monitoring Division, pgs 115–153.

There are well recognized problems associated with adding both vitamins and minerals to beverages. Zinc supplements tend to have an objectionable taste, cause distortion of taste and cause mouth irritation, see for example U.S. Pat. No. 4,684,528 (Godfrey), issued Aug. 4, 1987.

Iron supplements tend to discolor foodstuff, or to be organoleptically unsuitable. Moreover, it is particularly difficult to formulate products containing minerals and, in particular, mixtures of bioavailable iron and zinc. These minerals not only affects the organoleptic and aesthetic properties of beverages, but also undesirably affects the nutritional bioavailability of the minerals themselves and the stability of vitamins and flavors.

Several problems exist with delivering a mixture of iron and zinc with or without vitamins in a beverage mix. A few of the problems are choosing iron and zinc compounds which are organoleptically acceptable, bioavailable, cost effective and safe. For example, the water soluble iron and zinc compounds, which are the most bioavailable cause unacceptable metallic aftertaste and flavor changes. In addition, the soluble iron complexes often cause unacceptable color changes. Even further, the iron complexes themselves are often colored. This makes formulating a dry powder that has a uniform color distribution in the mix more difficult. Often the reconstituted beverage does not have a suitable color identifiable with the flavoring agent. If the color of the powder, reconstituted beverage or flavor of the beverage is substantially altered, the beverage will not be consumed. Color and taste are key to consumer acceptance.

Many iron sources which have been successful commercially, have been found to be unsatisfactory for use herein. For example, U.S. Pat. No. 4,786,578 (Nakel et al), issued November 1988, relates to the use of iron-sugar complexes suitable for supplementing fruit beverages. While this supplement may produce an acceptable taste in certain fruit flavored beverages, the supplement causes discoloration and consumer detectable differences in some colored beverages. Iron sources typically used to fortify* chocolate milk were also found undesirable due to color problems and/or flavor problems.

It has further been found that iron is more bioavailable if administered in the form of chelates wherein the chelating ligands are amino acids or protein hydrolysates. See, for example, U.S. Pat. No. 3,969,540 (Jensen), issued Jul. 13, 1976 and U.S. Pat. No. 4,020,158 (Ashmead), issued Apr. 26, 1977. These chelated iron compounds are known in the art by various names such as iron proteinates, iron amino acid chelates and peptide or polypeptide chelates. These will be referred to herein simply as "amino acid chelated irons." A particularly desirable amino acid chelated iron is FERROCHEL made by Albion Laboratories. FERROCHEL is a free flowing, fine granular powder that provides a high bioavailable source of ferrous iron that is typically complexed or chelated with the amino acid glycine.

Unfortunately, it has also been found that FERROCHEL, when added to water or other aqueous solutions, imparts relatively quickly a deep rusty yellow color. Such a color can change the color appearance the food or beverage to which FERROCHEL has been added. In the case of many foods and beverages, this color change would be unacceptable. It has been found that FERROCHEL causes unacceptable off-color development in various foods and beverages by interacting with dietary components such as the polyphenols and flavonoids. Furthermore, by accelerating the oxidative rancidity of fats and oils, FERROCHEL (like ferrous sulfate) has been found to cause off-flavor in foods and beverages.

It has now been found that compositions containing particular iron and zinc sources, coloring agents, a flavor component, and optionally a sweetener are very pleasant to taste and leave no undesirable aftertaste. Further, the composition has a uniform color as a powder and an acceptable color as a reconstituted beverage. The mix is provided in a manner which avoids agglomeration or caking. This free-flowing convenient form allows the consumer to simply add the desired level of the mix needed for reconstitution into the beverage form. It has been additionally found that beverages and foods can be fortified with iron, especially amino acid chelated iron, without imparting objectionable color and taste.

Accordingly, an object of this invention is to provide a beverage mix supplemented with nutritional amounts of zinc and iron which is palatable and does not have a disagreeable aftertaste while preserving the bioavailability of the metal ions.

Another object of the present invention is to provide dry beverage mixes which immediately upon reconstitution have an acceptable color.

It is a further object of the present invention to fortify beverages and foods with iron, especially amino acid chelated iron, without imparting objectionable color.

These and other objects will be obvious from the description herein.

SUMMARY OF THE INVENTION

The present invention relates to a dry free-flowing beverage composition which when reconstituted has a desirable color and is free of undesirable aftertaste comprising:

(1) from about 5% to about 100% of the USRDI of iron, wherein said iron is encapsulated ferrous sulfate or chelated iron;

(2) optionally from about 5% to about 100% of the USRDI of zinc;

(3) from about 0.001% to about 0.5% of a coloring agent;

(4) from about 0.001% to about 10% of a flavoring agent wherein said flavoring agent is selected from fruit or botanical flavors, or mixtures thereof; and (5) from about 1% to about 50% citric acid, sodium citrate, tartaric acid or malic acid or mixtures thereof; or other edible acid sufficient to lower the pH to between 3 and 4.5 in the finished beverage.

The dry beverage mixes of the present invention may also contain a sweetener. In addition, the dry beverage mix can contain vitamin A, vitamin C, vitamin E, vitamin $B_{12}$, vitamin $B_2$, vitamin $B_6$, vitamin D, folic acid, iodine, thiamine, niacin, fluoride and calcium. Polyphenols and/or flavonoids such as tannic acid may also be added for astringency. A one unit portion of the finished beverage provides from 5% to 200% of the USRDI for these other vitamin and mineral materials.

The present invention further relates to beverages and foods, especially dry beverage mixes and ready-to-drink beverages which are not carbonated and aqueous foods other than beverages, that are fortified with iron, especially amino acid chelated iron, without imparting objectionable color. These beverages and foods comprise:

(1) from about 5% to about 100% of the USRDI of iron;

(2) optionally from about 5% to about 100% of the USRDI of zinc;

(3) from about 0.001% to about 0.5% of a coloring agent;

(4) optionally from about 0.001% to about 10% of a flavoring agent wherein said flavoring agent is selected from fruit or botanical flavors, or mixtures thereof; and (5) at least one agent selected from ferric ion reducing agents and agents capable of preferentially complexing ferric ion in the presence of polyphenols, phenolic acids or flavonoids in an amount sufficient such that the beverage or food, in the absence of the coloring agent, has a Hunter-L value of 11 or greater as measured according to the Tannic Acid Test;

(6) wherein the beverage or food has a pH of about 5 or less, as is or when dissolved in an aqueous liquid.

It is believed that off-color development caused in iron fortified beverages and foods occurs when ferrous ion is converted to ferric ion that then complexes with other dietary components in the beverage or food such as polyphenols and flavonoids. However, it has been surprisingly found that ferric ion will not cause such off-color if a ferric ion reducing agent, such as ascorbic acid, and/or an agent such as citric acid that is capable of preferentially complexing ferric ion in the presence of polyphenols or flavonoids that are typically present in these beverages or foods, is included appropriate amounts. The ability of these complexing and/or reducing agents to prevent off-color development has also been found to be pH dependent. While the optimum pH can vary depending on the particular complexing or reducing agent, a pH about 5 or less has been found to be suitable for the range of complexing and reducing agents that can be used in the present invention.

DETAILED DESCRIPTION OF THE INVENTION

As used herein, the term "comprising" means various components conjointly employed in the preparation of the dry fruit flavored beverage mix of the present invention. Accordingly, the, terms "consisting essentially of" and "consisting of" are embodied in the term "comprising".

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources. These fruit flavors can be derived from natural sources such as fruit juices and flavor oils or synthetically prepared. If desired, fruit juices, including orange, pineapple, lemon, lime, apple and grape can be used as a flavor component.

As used herein, the term "botanical flavor" or "botanical extract" refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include hibiscus, marigold, chrysanthemum and the like. These botanical flavors can be derived from natural sources such as essential oils and extracts or be synthetically prepared.

As used herein, the term "coloring agent" or "color" refers to an edible food color or materials which color the beverage such as riboflavin and/or β-carotene.

As used herein, the term "total moisture" means the total water present in the dry mix that includes the water present in the flavoring agent, sugars, minerals, vitamins and other ingredients.

As used herein, the terms "beverage" or "finished beverage" means the drink that is prepared by mixing the dry mixes of present invention with or without additional sweetener and an aqueous liquid.

As used herein, the terms "per serving", "per unit serving" or "serving size" refers to 250 mls of the finished beverage.

As used herein, the "reconstituted" refers to a finished beverage prepared by mixing the requisite dry powder mix of the present invention with a sweetener and the appropriate level of diluent (typically water) or by mixing the fully sweetened powder with the appropriate level of diluent.

As used herein, all parts, percentages and ratios are based on weight unless otherwise specified.

The dry beverage mix further comprises nutritionally supplemental amounts of vitamins and minerals. As used herein, "nutritionally supplemental amounts" are amounts of vitamins and minerals used in the dry beverage mix herein which provide a measurable nourishing amount of the minerals and vitamins. As used herein, "nutrients" refers generally to minerals and vitamins.

The U.S. Recommended Daily Intake (USRDI) for vitamins and minerals are defined and set forth in the Recommended Daily Dietary Allowance-Food and Nutrition Board, National Academy of Sciences-National Research Council. A serving size of 250 mls prepared by dissolving about 35 grams of the semi-sweetened dry beverage mix or about 125 grams of the fully sweetened dry beverage mix in one liter of water is used to calculate USRDI values herein. When no sugar is used in the dry mix, about 6 gm of dry mix will generally provide the USRDI of vitamins and minerals.

As used herein, a nutritionally supplemental amount of minerals other than iron or zinc is at least about 5%, preferably from about 10% to about 200%, of the USRDI of such minerals. As used herein, a nutritionally supplemental amount of vitamins is at least about 5%, preferably from about 20% to about 200%, more preferably from about 25% to 100%, of the USRDI of such vitamins.

It is recognized, however, that the preferred daily intake of any vitamin or mineral may vary with the user. For example, persons suffering with anemia may require an increased intake of iron. Persons suffering vitamin deficiencies or who have poor diets will require more vitamin A, vitamin C and vitamin $B_2$, particularly growing children in developing countries. Such matters are familiar to physicians and nutritional experts, and usage of the compositions of the present invention may be adjusted accordingly.

As used herein, the terms "which is not carbonated" or "noncarbonated" means a beverage or food which has less than about 0.5 volumes of dissolved carbon dioxide.

As used herein, the term "aqueous food" means a food that contains water or is normally reconstituted with water before consumption.

Iron Source

The iron compounds which have been found useful for the purpose of the present invention are ferrous sulfate encapsulated in a hydrogenated soybean oil matrix, for example., CAP-SHURE® available from Balchem Corp., Slate Hill, N.Y. and chelated iron (i.e., ferrous) wherein the chelating agents are amino acids, for example., FERROCHEL AMINO ACID CHELATE available from Albion Laboratories, Inc., Clearfield, Utah). Other solid fats can be used to encapsulate the ferric sulfate, such as, tristearin, hydrogenated corn oil, cottonseed oil, sunflower oil, tallow and lard.

Ferrous iron is typically better utilized by the body than ferric iron. Highly bioavailable food grade ferrous salts that can be used in the present invention include ferrous sulfate, ferrous fumarate, ferrous succinate, ferrous gluconate, ferrous lactate, ferrous tartrate, ferrous citrate, ferrous amino acid chelates, as well as mixtures of these ferrous salts. While ferrous iron is typically more bioavailable, certain ferric salts can also provide highly bioavailable sources of iron. Highly bioavailable food grade ferric salts that can be used in the present invention are ferric saccharate, ferric ammonium citrate, ferric citrate, ferric sulfate, ferric chloride, as well as mixtures of these ferric salts.

Ferrous amino acid chelates particularly suitable as highly bioavailable amino acid chelated irons for use in the present invention are those having a ligand to metal ratio of at least 2:1. For example, suitable ferrous amino acid chelates having a ligand to metal mole ratio of two are those of formula:

where L is an alpha amino acid, dipeptide, tripeptide or quadrapeptide reacting ligand. Thus, L can be any reacting ligand that is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these alpha amino acids. See U.S. Pat. No. 3,969,540 (Jensen), issued Jul. 13, 1976 and U.S. Pat. No. 4,020,158 (Ashmead), issued Apr. 26, 1977; U.S. Pat. No. 4,863,898 (Ashmead et al), issued Sep. 5, 1989; U.S. Pat. No. 4,830,716 (Ashmead), issued May 16, 1989; and U.S. Pat. No. 4,599,152 (Ashmead), issued Jul. 8, 1986, all of which are incorporated by reference. Particularly preferred ferrous amino acid chelates are those where the reacting ligands are glycine, lysine, and leucine. Most preferred is the ferrous amino acid chelate sold under the Trade name FERROCHEL by Albion Laboratories where the reacting ligand is glycine.

In addition to these highly bioavailable ferrous and ferric salts, other sources of bioavailable iron can be included in the edible mixes and ready-to-serve beverages of the present invention. Other sources of iron particularly suitable for fortifying edible mixes and ready-to-serve beverages of the present invention included certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar- carboxylate complex. Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid, tartaric acid, lactic acid, succinic acid, propionic acid, etc., as well as mixtures of these acids.

These iron-sugar-carboxylate complexes can be prepared in the manner described in U.S. Pat. Nos. 4,786,510 and 4,786,518 (Nakel et al) issued Nov. 22, 1988, both of which are incorporated by reference. These materials are referred to as "complexes," but they may, in fact, exist in solution as complicated, highly hydrated, protected colloids; the term "complex" is used for the purpose of simplicity.

The amount of iron compound added to the beverage dry mix can vary widely depending upon the level of supplementation desired in the final product and the targeted consumer. The USRDI for iron generally range from 10 mg per 6 kg female or male to 18 mg per 54–58 kg female, depending somewhat on age. The iron fortified compositions of the present invention typically contain from about 5% to about 100% USRDI of iron (based per serving) to account for iron which is available from other dietary sources (assuming a reasonably balanced diet). Preferably the compositions contain from about 15% to about 50%, and most preferably about 20% to about 40% of the USRDI for iron.

Zinc Source

The zinc compounds which can be used in the present invention can be in any of the commonly used forms such as the sulfate, chloride, acetate, gluconate, ascorbate, citrate, aspartate, picolinate, amino acid chelated zinc, as well as zinc oxide. It has been found, however, because of taste reasons, that zinc gluconate and amino acid chelated zinc are particularly preferred. The zinc fortified composition of the present invention typically contain from about 5% to about 100% USRDI of zinc (based per serving) to account for that which is available from other dietary sources (assuming a reasonably balanced diet). Preferably the compositions contain from about 15% to about 50% and, preferably from about 25% to 40% of the USRDI for zinc.

Other Vitamins and Minerals

The dry beverage mix of the present invention can contain in addition to iron and zinc, other vitamins and minerals, for example vitamin C, calcium, vitamin A, vitamin C, niacin, thiamin, vitamin $B_6$, vitamin $B_2$, vitamin $B_{12}$ folic acid, and iodine.

Current USRDI values for most healthy adults are generally: vitamin C (60 mg), vitamin A as retinol (1 mg) or as β-carotene (3 mg), vitamin $B_2$ (1.7 mg), niacin (20 mg), thiamin (1.5 mg), vitamin $B_6$ (2.0 mg), folic acid (0.4 mg), vitamin $B_{12}$ (6 μg), and vitamin E (30 international units) and for iodine is 150 μg.

The USRDI for calcium will range from 360 mg per 6 kg for infants to 1200 mg per 54–58 kg female, depending somewhat on age. Moreover, it can be difficult to supplement beverages with more than 20–30% USRDI of calcium (based per serving) without encountering precipitation and or organoleptic problems. However, this level of supplementation is equivalent to that provided by cow's milk, and is therefore acceptable.

Commercially available sources of vitamin C can be used herein. Encapsulated ascorbic acid and edible salts of ascorbic acid can also be used. Typically, from about 5% to about 200% of the USRDI of vitamin C is used in the dry beverage mix. Preferably from about 25% to about 150%, and most preferably about 100% of the USRDI for vitamin C is used in 35 g of the dry beverage mix.

Commercially available vitamin A sources can also be incorporated into the dry beverage mix. A single serving preferably contains from about 5% to about 100% and most preferably contains about 25% of the USRDI of vitamin A. Vitamin A can be provided, for example, as vitamin A palmitate (retinol palmitate) and/or as beta-carotene. It can be as an oil, beadlets or encapsulated. As used herein, "vitamin A" includes vitamin A, β-carotene, retinol palmitate and retinol acetate.

Commercially available sources of vitamin $B_2$ (riboflavin) can be used herein. The resulting dry beverage mix preferably contains (per serving) from about 5% to about 200% and most preferably contains from about 15% to about 35% of the USRDI of vitamin $B_2$. Vitamin $B_2$ is also called riboflavin.

Commercial sources of iodine, preferably as an encapsulated iodine are used herein. Other sources of iodine include iodine containing salts, e.g., sodium iodide, potassium iodide, potassium iodate, sodium iodate, or mixtures thereof. These salts may be encapsulated.

Nutritionally supplemental amounts of other vitamins for incorporation into the dry beverage mix include, but are not limited to, vitamins $B_6$ and $B_{12}$, folic acid, niacin, pantothenic acid, folic acid, and vitamins D and E. Typically, the dry beverage mix contains at least 5%, preferably at least 25%, and most preferably at least 35% of the USRDI for these vitamins. Other vitamins can also be incorporated into the dry beverage mix depending on the nutritional needs of the consumers to which the beverage product is directed.

Nutritionally supplemental amounts of other minerals for incorporation into the dry beverage mix include, but are not limited to, calcium, and copper. Any water soluble salt of these minerals can be used, e.g., copper sulfate, copper gluconate, copper citrate. A preferred calcium source is a calcium citrate-malate composition described in U.S. Pat. No. 4,789,510, U.S. Pat. No. 4,786,518 and U.S. Pat. No. 4,822,847. Calcium in the form of calcium phosphate, calcium carbonate, calcium oxide, calcium hydroxide, calcium lactate and amino acid chelated calcium can also be used.

Coloring Agent

The key to obtaining a uniform color in the dry beverage mix of the present invention is the incorporation of small amounts of coloring agent. FD&C dyes (e.g. yellow #5, blue #2, red #40) and/or FD&C lakes are preferably used. By adding the lakes to the other powdered ingredients, all the particles, in particular the colored iron compound, are completely and uniformly colored and a uniformly colored beverage mix is attained. Preferred lake dyes which may be used in the present invention are the FDA-approved Lake, such as Lake red #40, yellow #6, blue #1, and the like. Additionally, a mixture of FD&C dyes or a FD&C lake dye in combination with other conventional food and food colorants may be used. However, it has been found, that when FD&C food dyes, not of the lake type are used exclusively, the color of the beverage mix is not uniform. In addition, substantial packing and caking occurs. The exact amount of coloring agent used will vary, depending on the agents used and the intensity desired in the finished product. The amount can be readily determined by one skilled in the art. Generally the coloring agent should be present at a level of from about 0.001% to about 0.5%, preferably from about 0.004% to about 0.1% by weight of the dry powder. When the beverage is lemon flavored or yellow in color, riboflavin can be used as the coloring agent. β-carotene and riboflavin both contribute to the color of orange beverages.

Flavoring Agent

The dry beverage mix can be flavored with any natural or synthetically prepared fruit or botanical flavors or with mixtures of botanical flavors and fruit juice blends. Suitable natural or artificial fruit flavors include lemon, orange, grapefruit, strawberry, banana, pear, kiwi, grape, apple, lemon, mango, pineapple, passion fruit, raspberry and mixtures thereof. Suitable botanical flavors include jamaica, marigold, chrysanthemum, tea, chamomile, ginger, valerian, yohimbe, hops, eriodictyon, ginseng, bilberry, rice, red wine, mango, peony, lemon balm, nut gall, oak chip, lavender, walnut, gentiam, luo han guo, cinnamon, angelica, aloe, agrimony, yarrow and mixtures thereof. From about 0.01% to about 10% of these flavors can be used. Preferably from about 0.02% to 8% is used. Dry fruit juices can also be used as flavorants. The actual amount of flavoring agent will depend on the type of flavoring agent used and the amount of flavor desired in the finished beverage. Tannic acid or other similar acids can be used to provide an astringent taste to the beverage. From about 0.001% to about 10% tannic acid is used. Other flavor enhancers, as well as flavorants such as chocolate, vanilla, etc., can also be used.

Acid Component

An important component of the fruit flavor system and dry beverage mix is an edible acid which lowers the pH to less than 4.5. Preferably the pH is from 3.2 to 4.5. These acids may be used alone or in combination. Generally from about 1% to 50% citric and/or malic acid is used, preferably from about 8% to about 20%, and more preferably from about 9% to about 17% citric and/or malic acid is used. Typically a level of from about 0.01% to about 10% tannic acid, malic acid or tartaric acid and mixtures thereof are used with certain botanical flavors to impart astringency. Citric and malic acids are naturally present in fruit juices and therefore juices or dried juice powders may be used as the source of the acid or acid mixture. Other edible acids that can be used include phosphoric, acetic acid, lactic acid, and maleic acid.

Sweetener

The dry beverage mix of the present invention further comprises from 0% to 98% sweetener. From 10% to about 98%, more preferably from about 50% to about 90%, by weight of particulate sugar or sweetener is used. Suitable particulate sugars can be granulated or powdered, and can include sucrose, fructose, dextrose, maltose, lactose and mixtures thereof. Most preferred is sucrose. When artificial sweeteners are used, the level of sweetener is considerably lower, usually from about 0.05% to about 10% is used. Often gums, pectins and other thickeners are used with artificial sweeteners to act as bulking agents and provide texture to the reconstituted dry beverage. Mixtures of sugars and artificial sweeteners can be used.

In addition to the added particulate sugar in the dry beverage mix, other natural or artificial sweeteners can also be incorporated therein. Other suitable sweeteners include saccharin, cyclamates, acesulfam-K, L-aspartyl-L-phenylalanine lower alkyl ester sweeteners (e.g. aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethylalkaneamide sweeteners disclosed in U.S. Pat. No. 4,338,346 to Brand, L-aspartyl-1-hydroxyethyalkaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred optional and additional sweetener is aspartame.

Other Ingredients

The dry beverage mix can further comprise other ingredients commonly used in food or beverage products to provide flavor, aesthetics, texture, stability, anticaking or nutritional benefits. As described hereinafter, such optional other ingredients will typically be incorporated into the beverage premix, although such ingredients can also be incorporated individually or in various combinations into the dry beverage mix.

Clouding/Thickening Agent

The dry beverage mix may further comprise from about 0% to about 15%, preferably from about 0.02% to about 10%, by weight of a thickening or cloud agent. Most preferably from about 1% to about 5% is used. Any known or conventional thickening and clouding agents can be used. The thickening or cloud agent can also help prevent sedimentation of the reconstituted dry beverage mix. The thickeners also help to mask bitter and astringent flavors.

Any food grade thickening or cloud agent can be used in the dry beverage mix provided that it is compatible with the other essential ingredients therein. Suitable thickening or cloud agents include, but are not limited to, carboxymethylcellulose (CMC), carrageenan, xanthan, pectin, guar and various food starches (modified and unmodified), corn syrup solids and vegetable oils or partially hydrogenated vegetable oils. Selection of the thickening agent will be determined primarily by cost, and secondarily by thickening-enhancing characteristics. Mixtures of these agents can also be used. A preferred clouding/thickening agent is a mixture of from 40% to 60% corn syrup solids, 20% to 35% modified food starch, 8% to 20% partially hydrogenated soybean oil and 1% to 5% xanthan gum.

Antioxidant

The beverage premix may further comprise a food grade antioxidant in an amount sufficient to inhibit oxidation of materials, especially lipids, in the dry beverage mix. Excessive oxidation can contribute to off-flavor development and flavor loss. Excessive oxidation can also lead to degradation and inactivation of any ascorbic acid or other easily oxidized vitamin or minerals in the mix.

Known or conventional food grade antioxidants can be used in the dry beverage mix. Such food, grade antioxidants include, but are not limited to, butylated hydroxyanisole (BHA), butylated hydroxytoluene (BHT), and mixtures thereof. Selection of an effective amount of a food grade antioxidant is easily determined by the skilled artisan. Limitations on such amounts or concentrations are normally subject to government regulations.

To further enhance oxidative stability, the dry beverage mix should be packaged in a moisture impervious container. Such containers include, for example, foil lined packages, metal cans and plastic or laminated packages. Foil lined packages or other oxygen and water impermeable containers are preferred. The dry beverage mix can be packaged under nitrogen, carbon dioxide or other inert non-oxidizing gases to further enhance oxidative stability. Such packaging methods are well known in the art. Moisture content should not exceed about 6% by weight of the dry beverage mix.

Complexing/Reducing Agents and pH

To prevent off-color development caused by fortification of beverages or foods with iron according to the present invention, it is important to include at least one agent selected from: (1) ferric ion reducing agents (i.e., a reducing agent capable of reducing any ferric ion that is formed to ferrous ion); (2) agents capable of preferentially complexing ferric ion in the presence of polyphenols (e.g., tannins such as tannic acid), phenolic acids (e.g., gallates, caffeic, chlorogenic acid) or flavonoids (e.g., anthocyanins, catechins, flavonols) that are typically present in these beverages or foods. Suitable reducing agents include ascorbic acid, ascorbyl palmitate, sodium bisulfite, erythorbic acid, as well as mixtures of these reducing agents. The preferred reducing agent is ascorbic acid. Suitable complexing agents include hydroxypolycarboxylic acids such as citric acid, tartaric acid, and malic acid, polyphosphates and their respective salts such as sodium hexametaphosphate, sodium trimetaphosphate, and sodium tripolyphosphate, aminopolycarboxylic acids and their respective partial salts such as ethylenediamine tetraacetic acid, the disodium salt of ethylenediamine tetraacetic acid, and diethylenetriamine pentaacetic acid, certain short chain carboxylic acids such as lactic acid and acetic acid, as well as mixtures of these complexing agents. Preferred complexing agents are citric acid, tartaric acid, sodium hexametaphosphate and ethylenediamine tetraacetic acid (EDTA).

These complexing agents and/or reducing agents are included in the food or beverage in an amount sufficient to prevent the iron source from generating undesired off-colors. What constitutes such an amount is based on the Hunter-L value of the beverage or food (in the absence of any coloring agents) according to the present invention is determined by the Tannic Acid Test. The Tannic Acid Test measures the Hunter-L color of a mixture containing tannic (240 mg), the iron source (equivalent to at least 5 mg of iron), and an appropriate amount of the complexing and/or reducing agent. This mixture is dissolved in deionized water (240 ml). For most iron sources, the color can be measured within 15 minutes. However, color of some more slowly dissolving/oxidizing iron sources, such as ferric saccharate, should normally be measured after 24 hours. The amount of the complexing and/or reducing agent will be sufficient if the Hunter-L value of the measured solution is about 11 or greater (typically in the range of from about 12 to about 14). Conversely, the amount of the complexing and/or reducing agent will be insufficient if the Hunter-L value is less than about 11 and is typically evidenced by the formation of a purple or red-purple color in the measured solution.

In the case of citric acid, a ratio of complexing agent to iron source in the range of from about 1:1 to about 2000:1, preferably about from about 20:1 to about 500:1, is usually sufficient to prevent undesired color formation. In the case of ascorbic acid, a ratio of reducing agent to iron source in the range of from about 4:1 to about 50:1, preferably about from about 8:1 to about 25:1, is usually sufficient to prevent undesired color formation. Suitable ratios for the other complexing and/or reducing agents can be determined similarly using the Tannic Acid Test.

The ability of these complexing and/or reducing agents to prevent off-color development has also been found to be pH dependent. The optimum pH can vary depending on the particular complexing or reducing agent. Since these complexing and/or reducing agents are acids, keeping the pH of the beverage or food at or below the pKa of the acid will normally be sufficient. In this regard, a pH about 5 or less has been found to be suitable for the range of complexing and reducing agents that can be used in the present invention varies depending on the antioxidant or chelant/complexing agent used. Typically, the pH is kept in the range of from about 2 to about 5, preferably from about 2.5 to about 4.5.

Dry Beverage Mix

The dry beverage mix of the present invention can be diluted with water to form noncarbonated beverages or carbonated water to form a carbonated beverages.

The dry beverage mix of the present invention is a flowable particulate composition containing not more than about 6% by weight of total moisture. It is desirable to keep the total moisture level in the dry beverage mix below 6% to avoid degradation of the vitamins and other undesirable reactions. Preferably the moisture content is below about 3%, and is typically in the range of from about 4 to about 5%.

A single serving size of the dry beverage mix will vary with individual consumer preference and with the specific dry beverage mix formulation. It is especially important that the product formulation delivers the desired amount of vitamins and minerals per single serving of the diluted beverage product. Generally, a liter of the beverage can be prepared by using from about 35 to about 125 grams of the dry beverage mix when sugar is used as the sweetener and about 6 gms when an artificial sweetener is used.

The dry beverage mixes of the present invention may be made as a semi-sweetened powder of as a fully sweetened powder. Preparation of a flavored beverage from the semi sweetened dry beverage mix will involve mixing from about 20 grams to about 35 grams of the dry beverage mix with about 30 grams to about 85 grams of sugar in addition to a diluent (e.g., tap water). Preparation of a flavored beverage from the fully sweetened dry beverage mix will involve simply mixing from about 70 to about 125 grams of the dry beverage mix with a diluent. The diluent can be hot or cold. Typically, about 1,000 mls of diluent will be added per single serving of the dry beverage mix to form a reconstituted fruit/botanical flavored beverage.

Preparation of the Dry Beverage Mix

The dry mixes of the present invention may be prepared by a variety of means such as dry blending the ingredients, spray drying, agglomeration, drum drying and other conventional means of providing a dry mix of uniform consistency. The preferred process comprises admixing the requisite amounts of essential ingredients of the dry beverage mix described herein before. Preferably, the mixing is done using conventional plow type or paddle mixers.

Preferably, the process comprises dry mixing all other ingredients except the sugar as an isolated premix and then dry mixing this isolated admixture with the sugar to form the dry beverage mix of the present invention. The particulate sugar, flavors, vitamins, minerals and encapsulated flavor are preferably admixed together to allow the fine flavor particles to adhere around the sugar particles. This will improve dispersability of the dry beverage mix when reconstituted with water.

The physical form of the dry beverage mix can be tailored according to consumer preferences. For example, the dry beverage mix can be processed into a less dense, agglomerated mixture or left as a fine powder.

Ready-to-Drink Beverages and Foods Other Than Beverages

The present invention is also useful in ready-to-drink beverages and a variety of aqueous foods other than beverages. These include baked good mixes (e.g., bread, cakes, brownies, muffins, cookies, pastries, pies, crackers, pie crusts), fried snacks derived from potatoes, corn, wheat and other grains (e.g., Pringle's potato chips, corn chips, tortilla chips), other fried farinaceous snack foods (e.g., french fries, doughnuts, fried chicken), dairy products and artificial dairy products (e.g., butter, ice cream and other fat-containing frozen desserts, yogurt, and cheeses, including natural cheeses, processed cheeses, cream cheese, cottage cheese, cheese foods and cheese spread, milk, cream, sour cream, butter milk, and coffee creamer), cereal products, baby foods or formulas, puddings, ice cream, dips, syrups, pie and other dessert fillings, frostings, emulsified spreads such as salad dressings, mayonnaise and margarines, various kinds of soups, dips, sauces and gravies.

The preparation of ready-to-serve beverages can be carried out in a similar manner to the preparation of dry beverage mixes, at least as it relates to the dry ingredients (e.g., iron source, milk solids, vitamins and other minerals, etc.). The primary difference is the addition of an aqueous fluid, typically in an amount of from about 60 to about 98%, preferably from about 75 to about 95%, of the finished ready-to serve beverage product. Suitable aqueous fluids include water and milk.

EXAMPLE 1

A lemon flavored drink mix made from a lemon/lime combination (herein after "limon") drink mix is prepared from the following ingredients:

| INGREDIENT | Percent by Weight |
|---|---|
| granulated sucrose | 73.9 |
| vitamin premix[1] | 1 |
| flavors[2] | 4.9 |
| clouding agent[3] | 1.4 |
| citric acid | 12.0 |
| zinc gluconate | 0.4 |
| ferric saccharate | 0.6 |
| sodium citrate | 5.1 |
| color | 0.1 |
| Total | 100.00 |
| Vitamin Premix[1] | |
| Vitamin C | 60.2 |
| Vitamin A | 4.9 |
| Vitamin E | 14.9 |
| Vitamin B$_2$ | 0.6 |
| Vitamin B$_{12}$ | 2.1 |
| Vitamin B$_6$ | 0.6 |
| Folic Acid | 0.1 |
| Maltodextrin | 16.6 |

[1]Vitamin Premix
[2]The flavor is a combination of two lemon flavors; including a lemon/lime flavor.
[3]The clouding agent is a mixture of corn syrup solids, modified food starch, partially hydrogenated soybean oil and xanthan gum.

A limon flavored, semi-sweetened mix is prepared by dry blending all the ingredients except for the coloring agent in a mixer. The color is then added to the aforementioned dry blend followed by additional dry blending for a period of time sufficient to provide even color distribution and uniform mixture. The dry mixture is then passed through a number 20 Tyler mesh screen and then through a number 30 Tyler mesh screen. The final product is agitated and packed into cans.

A sample of the mixture (35 gm) is blended with 1,000 ml of water followed by stirring. For comparative purposes, dry limon flavored mixes of Example 2 and Example 3 containing the following ingredients are prepared by the aforementioned procedure.

EXAMPLE 2

| INGREDIENT | Percent by Weight |
|---|---|
| granulated sucrose | 74.1 |
| vitamin premix[1] | 1 |
| flavors[2] | 4.9 |
| clouding agent[3] | 1.4 |
| color | 0.1 |
| citric acid | 12.6 |
| zinc gluconate | 0.4 |

| INGREDIENT | Percent by Weight |
|---|---|
| encapsulated ferrous sulfate[4] | 0.4 |
| sodium citrate | 5.1 |
| Total | 100 |

[1]Vitamin premix of Example 1
[2]The limon flavor is a combination of two flavors.
[3]The clouding agent is a mixture of corn syrup solids, modified food starch, partially hydrogenated soybean oil and xanthan gum.
[4]CAP-SHURE ® FS-165-50, Balchem Corporation, Slate Hill, New York

EXAMPLE 3

| INGREDIENT | Percent by Weight |
|---|---|
| granulated sucrose | 74.2 |
| vitamin premix[1] | 1 |
| flavors[2] | 4.9 |
| clouding agent[3] | 1.4 |
| color | 0.1 |
| citric acid | 12.6 |
| zinc gluconate | 0.4 |
| Ferrochel amino acid chelate[4] | 0.3 |
| sodium citrate | 5.1 |
| Total | 100 |

[1]Vitamin premix of Example 1
[2]The lemon-lime flavor is a combination of two flavors.
[3]The clouding agent is a mixture of corn syrup solids, modified food starch, partially hydrogenated soybean oil and xanthan gum.
[4]Ferrochel Amino Acid Chelate, Albion Laboratories, Inc., Clearfield, Utah Upon preparing beverages from the aforementioned lemon-lime dry mixes, it was observed that the beverages containing encapsulated ferrous sulfate and Ferrochel amino acid chelate were similar and had an acceptable green color. Surprisingly, the beverage containing the ferrous saccharate was discolored (i.e., muddy yellow-green). It was further observed that after about 4–6 hours of standing at room temperature, the beverage containing the ferric saccharate changed to a more acceptable color.

EXAMPLE 4

A Hunter Color Difference Meter was used to measure the degree of off-color produced by the addition of iron to the beverages prepared from the aforementioned dry mixes. Example 1 was read as prepared and then allowed to sit at room temperature for 24 hours in order to obtain a reading on the more acceptable product. The color coordinates of this color meter are L=visual lightness/darkness, a=redness-to-greenness, and b=yellowness-to-blueness. ΔL, Δa, and Δb represent differences between the L, a, and b of samples. ΔE is the total color difference. This was calculated from the equation $\Delta E = \sqrt{(L_1-L_2)^2+(a_1-a_2)^2+(b_1-b_2)^2}$, where $L_1$, $a_1$ and $b_1$ are the initial readings and $L_2$, a2 and $b_2$ are the readings after aging for 24 hours at 75° F. (23.8° C.) A ΔE reading greater the 3.0 indicates that there will be a consumer noticeable difference in these products. The results are present in Table 1.

TABLE 1

| Sample | $L_1$ | $a_1$ | $b_1$ | $L_2$ | $a_2$ | $b_2$ | $\Delta L$ | $\Delta a$ | $\Delta b$ | $\Delta E$ |
|---|---|---|---|---|---|---|---|---|---|---|
| No iron | 28.5 | −6.9 | 13.1 | 27.1 | −9 | 14 | 1.96 | 4.41 | 0.81 | 2.68 |
| Example 1 | 25.6 | −3.2 | 12.3 | 25.6 | −8.6 | 12.9 | 0 | 29.16 | 0.36 | 5.43 |
| Example 2 | 28.1 | −7.8 | 12.5 | 26.5 | −9.8 | 13.3 | 2.56 | 4 | 0.64 | 2.68 |
| Example 3 | 27.7 | −8.3 | 12.2 | 26.2 | −9.7 | 12.8 | 2.25 | 1.96 | 0.36 | 2.14 |

The data from beverages prepared according to Examples 2 and 3 showed small differences in color which are not consumer noticeable. The examples prepared using encapsulated ferrous sulfate and chelated iron were also similar in characteristics to that of the no iron beverage. However, the data from the beverage prepared according to Example 1 showed that it was significantly different from the other samples, and had a consumer detectable color difference after aging. For comparative purposes, similar tests were run using orange and jamaica beverages. It was observed that the orange and jamaica beverages containing ferrous saccharate also developed unacceptable colors.

EXAMPLE 5

A fully sweetened orange flavored drink mix is prepared from the following ingredients according to the mixing procedures of Example 1.

| INGREDIENT | Percent by Weight |
|---|---|
| granulated sucrose | 90.24 |
| vitamin premix[1] | 0.32 |
| orange flavor | 1.27 |
| clouding agent[2] | 1.4 |
| citric acid | 4.6 |
| zinc gluconate | 0.1 |
| iron (amino acid chelate) | 0.056 |
| sodium citrate | 1.9 |
| colors[3] | 0.121 |
| Total | 100.00 |

[1]Vitamin premix of Example 1 plus iodine as potassium iodide.
[2]The clouding agent is a mixture of corn syrup solids, modified food starch, partially hydrogenated soybean oil and xanthan gum.
[3]The colors are a combination of FD&C Lake Yellow #6 and FD&C dye Yellow #5.

A single serving of the finished beverage (250 mls) provides the following USRDI of these vitamins and minerals.

| NUTRIENT | % USRDI |
|---|---|
| Iron | 20 |
| Zinc | 25 |
| Iodine | 20 |
| Vitamin A | 25 |
| Vitamin C | 100 |
| Riboflavin | 35 |
| Folic Acid | 25 |
| B12 | 35 |
| Vitamin E | 25 |
| B6 | 25 |

EXAMPLE 6

A semi-sweetened Jamaica flavored (derived from hibiscus) drink mix is prepared from the following ingredients according to the mixing procedures of Example 1.

| INGREDIENT | PERCENT BY WEIGHT |
|---|---|
| granulated sucrose | 82.2 |
| vitamin premix[1] | 1.1 |
| flavor | 2.7 |
| citric acid | 8.1 |
| tannic acid | 0.27 |
| malic acid | 1 |
| zinc gluconate | 0.36 |
| iron (amino acid chelate) | 0.2 |
| sodium citrate | 3.7 |
| colors[2] | 0.37 |
| Total | 100.00 |

[1]Vitamin premix of Example 5.
[2]The colors are a combination of FD&C Lake red #40 and. FD&C Lake Blue #1.

Other formulations are prepared using the premix of Example 1 by blending the following ingredients.

EXAMPLE 7

A fully sweetened orange flavored drink mix is prepared from the following ingredients according to the mixing procedures of Example 1.

| INGREDIENT | PERCENT BY WEIGHT |
|---|---|
| granulated sucrose | 90.2 |
| vitamin premix[1] | 0.2 |
| flavor | 1.3 |
| clouding agent[2] | 1.4 |
| citric acid | 4.8 |
| zinc gluconate | 0.1 |
| iron (amino acid chelate) | 0.1 |
| sodium citrate | 1.9 |
| colors[3] | 0.1 |
| Total | 100.00 |

[1]Vitamin premix of Example 5.
[2]The clouding agent is a mixture of corn syrup solids, modified food starch, partially hydrogenated soybean oil and xanthan gum.
[3]The colors are a combination of FD&C Lake Yellow #6 and FD&C dye Yellow #5.

A single serving of the finished beverage (250 mls) provides 10% of the USRDI of vitamin C, vitamin A, vitamin E, vitamin $B_2$, folic acid, vitamin $B_{12}$ and vitamin $B_6$ and 25% of the USRDI of the minerals iron and zinc.

EXAMPLE 8

A semi-sweetened orange flavored drink mix is prepared from the following ingredients according to the mixing procedures of Example 1.

| INGREDIENT | PERCENT BY WEIGHT |
|---|---|
| granulated sucrose | 64.5 |
| vitamin premix[1] | 1.1 |
| flavor | 4.6 |
| clouding agent[2] | 4.9 |
| citric acid | 17.1 |
| zinc gluconate | 0.3 |
| iron (amino acid chelate) | 0.2 |
| sodium citrate | 6.9 |
| colors[3] | 0.4 |
| Total | 100.00 |

[1]Vitamin premix of Example 5.
[2]The clouding agent is a mixture of corn syrup solids, modified food starch, partially hydrogenated soybean oil and xanthan gum.
[3]The colors are a combination of FD&C Lake Yellow #6 and FD&C dye Yellow #5.

A single serving of the finished beverage (250 mils) provides 50% of the USRDI of vitamin C, vitamin A, vitamin E, vitamin $B_2$, folic acid, vitamin $B_{12}$ and vitamin $B_6$ and 25% of the USRDI of the minerals iron and zinc.

EXAMPLE 9

A unsweetened orange flavored drink mix is prepared from the following ingredients according to the mixing procedures of Example 1.

| INGREDIENT | PERCENT BY WEIGHT |
|---|---|
| vitamin premix[1] | 4.0 |
| flavor | 12.8 |
| clouding agent[2] | 13.6 |
| citric acid | 47.8 |
| zinc gluconate | 1 |
| iron (amino acid chelate) | 0.6 |
| sodium citrate | 19.1 |
| colors[3] | 1.2 |
| Total | 100.00 |

[1]Vitamin premix of Example 5.
[2]The clouding agent is a mixture of corn syrup solids, modified food starch, partially hydrogenated soybean oil and xanthan gum.
[3]The colors are a combination of FD&C Lake Yellow #6 and FD&C dye Yellow #5.

A single serving of the finished beverage (250 mls) provides 100% of the USRDI of vitamin C, vitamin A, vitamin E, vitamin $B_2$, folic acid, vitamin $B_{12}$ and vitamin $B_6$ and 25% of the USRDI of the minerals iron and zinc.

It is obvious that other flavored and colored beverage mixes, e.g. mango, peach, strawberry, tangerine, and orange can be readily made by changing the coloring agent and flavoring ingredients of the mix. Accordingly, the examples given are for illustrative purposes only are not to be limiting thereof.

EXAMPLE 10

A fortified, ready-to-drink fruit juice beverage is prepared from the following ingredients:

| INGREDIENTS | PERCENT BY WEIGHT |
|---|---|
| Fruit juice beverage | 99.93 |
| FERROCHEL | 0.01 |
| Vitamin/Mineral Premix* | 0.058 |

*See Example 5

EXAMPLE 11

A fortified tea beverage is prepared from the following ingredients:

| INGREDIENTS | PERCENT BY WEIGHT |
|---|---|
| Tea solids | 0.79 |
| Sugar | 4.72 |
| Citric acid | 0.1 |
| Ascorbic acid | 0.04 |
| FERROCHEL | 0.01 |
| Water | 94.35 |

EXAMPLE 12

A fortified baby cereal is prepared from the following ingredients:

| INGREDIENTS | PERCENT BY WEIGHT |
|---|---|
| Oat meal with banana flakes | 9.02 |
| FERROCHEL | 0.023 |
| Vitamin/mineral premix* | 0.12 |
| EDTA | 0.66 |
| Water | 90.18 |

*See Example 5

What is claimed is:
1. A dry beverage composition comprising:
   (a) from about 5% to about 100% of the USRDI of iron, wherein the iron is ferrous amino acid chelated iron;
   (b) from 0% to about 98% of a sweetener, by weight of the composition;
   (c) an edible acid;
   (d) a coloring agent;
   (e) a flavoring agent selected from the group consisting of fruit flavors, botanical flavors, and mixtures thereof; and
   (f) an agent selected from the group consisting of ferric ion reducing agents, ferric ion complexing agents, and mixtures thereof;
   wherein the pH of the composition when combined with aqueous liquid is from about 2 to about 5 and wherein the composition forms a noncarbonated beverage when combined with aqueous liquid.
2. The composition according to claim 1 comprising from about 1% to about 50% of the edible acid, by weight of the composition.
3. The composition according to claim 2 wherein the ferrous amino acid chelate has the structure:

$$Fe(L)2$$

wherein L is selected from the group consisting of alpha-amino acids, dipeptides, tripeptides, and quadrapeptides and wherein at least one agent is a ferric ion reducing agent.

4. The composition according to claim 3 wherein L is selected from the group consisting of glycine, lysine, and leucine and wherein at least one of the ferric ion reducing agents is ascorbic acid.

5. The composition according to claim 4 wherein L is glycine.

6. The composition according to claim 1 wherein at least one edible acid is selected from the group consisting of citric acid, malic acid, tannic acid, tartaric acid, phosphoric acid, acetic acid, lactic acid, maleic acid, and mixtures thereof.

7. The composition according to claim 6 wherein the edible acid is citric acid.

8. The composition according to claim 6 further comprising at least one vitamin or mineral which is not iron or zinc.

9. The composition according to claim 8 comprising:
   (a) from about 15% to about 50% of the USRDI of iron;
   (b) from about 15% to about 50% of the USRDI of zinc;
   (c) a fruit flavor; and
   (d) at least three vitamins or minerals selected from the group consisting of: vitamin A, vitamin C, vitamin E, vitamin $B_2$, vitamin $B_{12}$, vitamin $B_6$, folic acid, niacin, calcium, and iodine.

10. The composition according to claim 9 wherein the pH of the composition when combined with aqueous liquid is from about 3 to about 4.5 and wherein the composition comprises from about 8% to about 20% of the edible acid.

11. The composition according to claim 10 wherein at least one sweetener is aspartame.

12. A composition selected from the group consisting of a noncarbonated ready-to-drink beverage, a noncarbonated beverage concentrate, and an aqueous food comprising:
   (a) from about 5% to about 100% of the USRDI of iron, wherein the iron is ferrous amino acid chelated iron;
   (b) from 0% to about 98% of a sweetener, by weight of the composition;
   (c) an edible acid;
   (d) a coloring agent;
   (e) a flavoring agent selected from the group consisting of fruit flavors, botanical flavors, and mixtures thereof; and
   (f) an agent selected from the group consisting of ferric ion reducing agents, ferric ion complexing agents, and mixtures thereof;
wherein the pH of the composition is from about 2 to about 5.

13. The composition according to claim 12 wherein the ferrous amino acid chelate has the structure:

$$Fe(L)2$$

wherein L is selected from the group consisting of alpha-amino acids, dipeptides, tripeptides, and quadrapeptides and wherein at least one agent is a ferric ion reducing agent.

14. The composition according to claim 13 wherein L is selected from the group consisting of glycine, lysine, and leucine and wherein at least one of the ferric ion reducing agents is ascorbic acid.

15. The composition according to claim 14 wherein L is glycine.

16. The composition according to claim 12 wherein at least one edible acid is selected from the group consisting of citric acid, malic acid, tannic acid, tartaric acid, phosphoric acid, acetic acid, lactic acid, maleic acid, and mixtures thereof.

17. The composition according to claim 16 wherein the edible acid is citric acid.

18. The composition according to claim 16 further comprising at least one vitamin or mineral which is not iron or zinc.

19. The composition according to claim 18 comprising:
   (a) from about 15% to about 50% of the USRDI of iron;
   (b) from about 15% to about 50% of the USRDI of zinc;
   (c) a fruit flavor; and
   (d) at least three vitamins or minerals selected from the group consisting of: vitamin A, vitamin C, vitamin E, vitamin $B_2$, vitamin $B_{12}$, vitamin $B_6$, folic acid, niacin, calcium, and iodine.

20. The composition according to claim 19 wherein at least one sweetener is aspartame.

21. A dry beverage composition comprising:
   (a) from about 5% to about 100% of the USRDI of iron, wherein the iron is ferrous amino acid chelated iron;
   (b) from 0% to about 98% of a sweetener, by weight of the composition;
   (c) an edible acid;
   (d) a coloring agent;
   (e) a flavoring agent selected from the group consisting of fruit flavors, botanical flavors, and mixtures thereof; and
   (f) a ferric ion reducing agent wherein the weight ratio of the reducing agent to iron is at least about 10:1 and wherein the reducing agent is included at a level such that when the components of the dry beverage composition other than the coloring agent are combined with an aqueous liquid to form a solution, the solution has a Hunter-L color value of at least about 11 when measured according to the Tannic Acid Test;
wherein the pH of the composition when combined with aqueous liquid is from about 2 to about 5.

22. The composition according to claim 21 wherein the weight ratio of the reducing agent to iron is from about 10:1 to about 50:1.

23. The composition according to claim 21 wherein the ferrous amino acid chelate has the structure:

$$Fe(L)_2$$

wherein L is selected from the group consisting of alpha-amino acids, dipeptides, tripeptides, and quadrapeptides.

24. The composition according to claim 23 wherein L is selected from the group consisting of glycine, lysine, and leucine.

25. The composition according to claim 23 wherein L is glycine.

26. The composition according to claim 21 wherein at least one edible acid is selected from the group consisting of citric acid, malic acid tannic acid, tartaric acid, phosphoric acid, acetic acid, lactic acid, maleic acid, and mixtures thereof.

27. The composition according to claim 26 wherein the edible acid is citric acid.

28. The composition according to claim 21 wherein at least one sweetener is aspartame.

29. A composition selected from the group consisting of a ready-to-drink beverage, a beverage concentrate, and an aqueous food comprising:
   (a) from about 5% to about 100% of the USRDI of iron, wherein the iron is ferrous amino acid chelated iron;
   (b) from 0% to about 98% of a sweetener, by weight of the composition;
   (c) an edible acid;

(d) a coloring agent;

(e) a flavoring agent selected from the group consisting of fruit flavors, botanical flavors, and mixtures thereof; and (f) a ferric ion reducing agent wherein the weight ratio of the reducing agent to iron is at least about 10:1 and wherein the reducing agent is included at a level such that when the components of the composition other than the coloring agent are combined, the composition has a Hunter-L color value of at least about 11 when measured according to the Tannic Acid Test;

wherein the pH of the composition is from about 2 to about 5.

30. The composition according to claim 29 wherein the weight ratio of the reducing agent to iron is from about 10:1 to about 50:1.

31. The composition according to claim 30 wherein L is selected from the group consisting of glycine, lysine, and leucine.

32. The composition according to claim 31 wherein L is glycine.

33. The composition according to claim 29 wherein at least one edible acid is selected from the group consisting of citric acid, malic acid, tannic acid, tartaric acid, phosphoric acid, acetic acid, lactic acid, maleic acid, and mixtures thereof.

34. The composition according to claim 33 wherein the edible acid is citric acid.

35. The composition according to claim 29 wherein at least one sweetener is aspartame.

* * * * *